Nov. 1, 1949  E. WENNERBO ET AL  2,486,898
MAGAZINE PHONOGRAPH
Filed Nov. 29, 1943  11 Sheets-Sheet 6
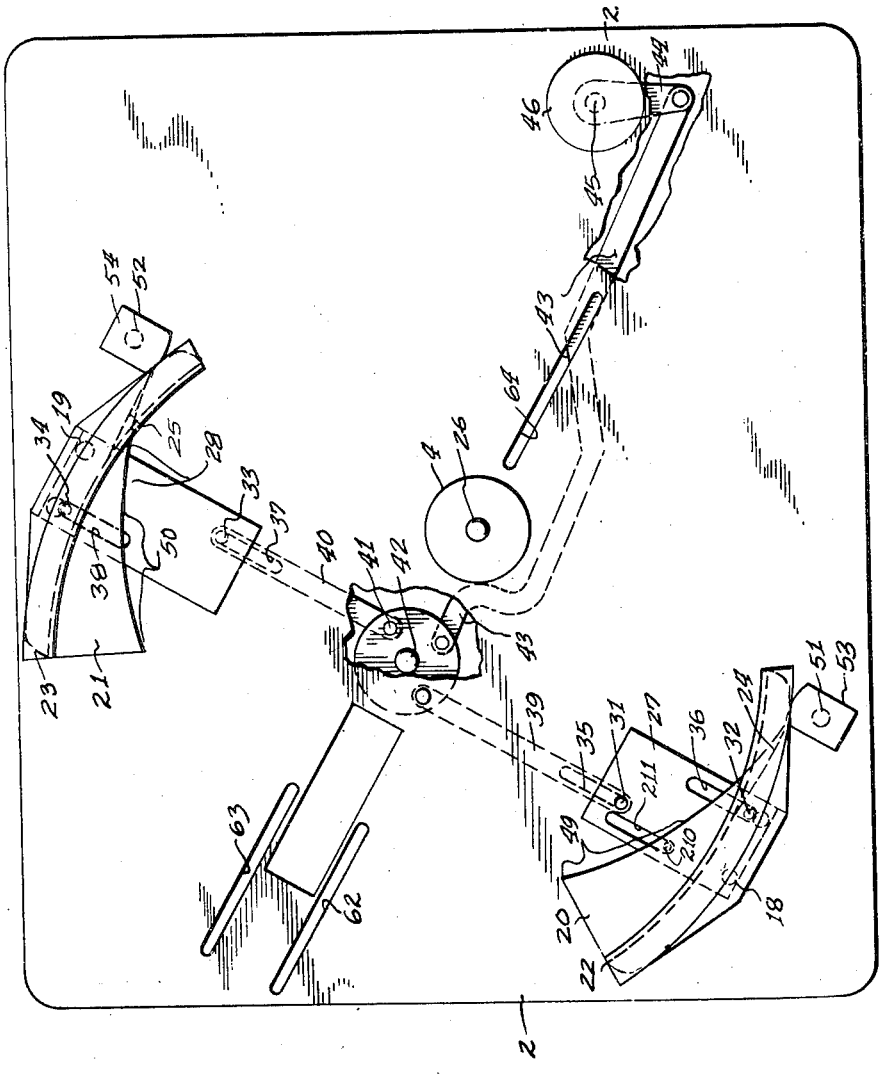
INVENTORS
ERIK WENNERBO & HELGE NOREN
BY
*Young, Emery & Thompson* Atty's.

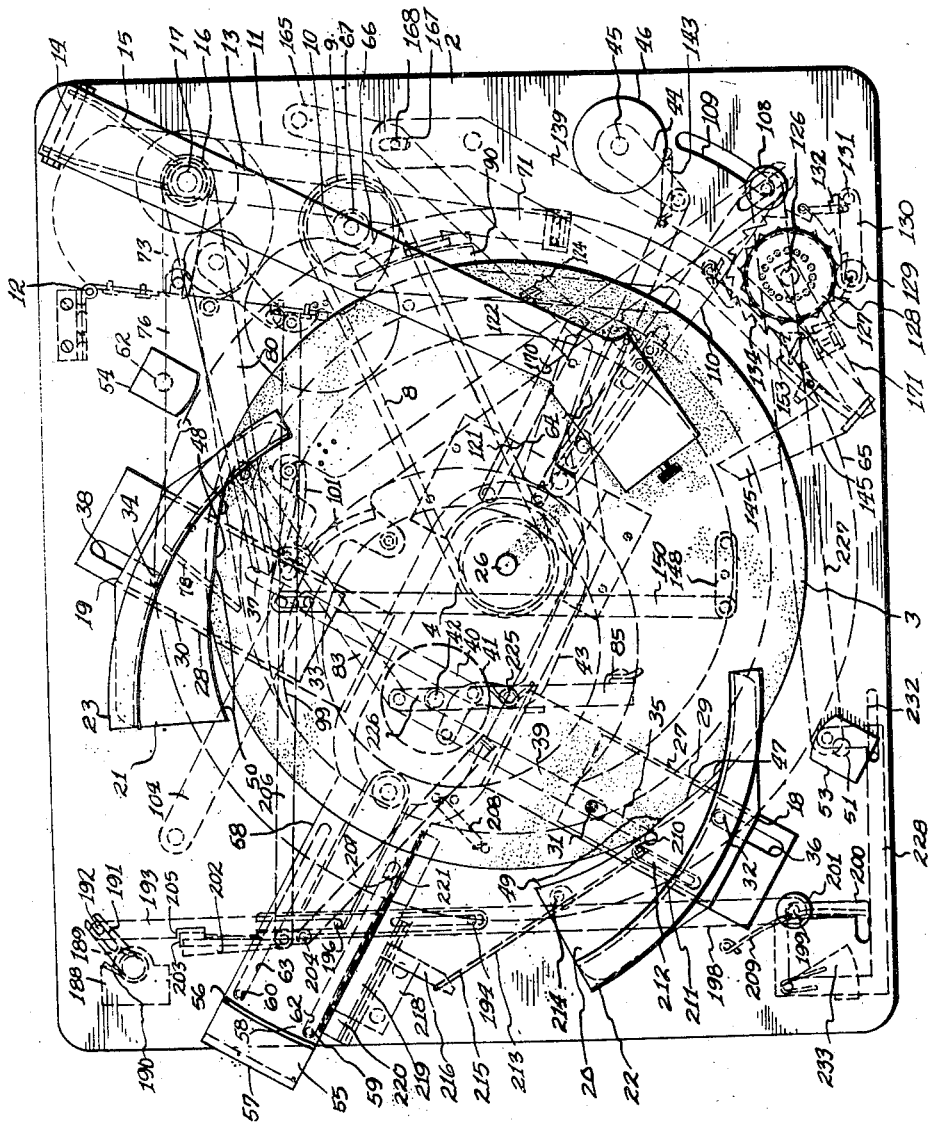

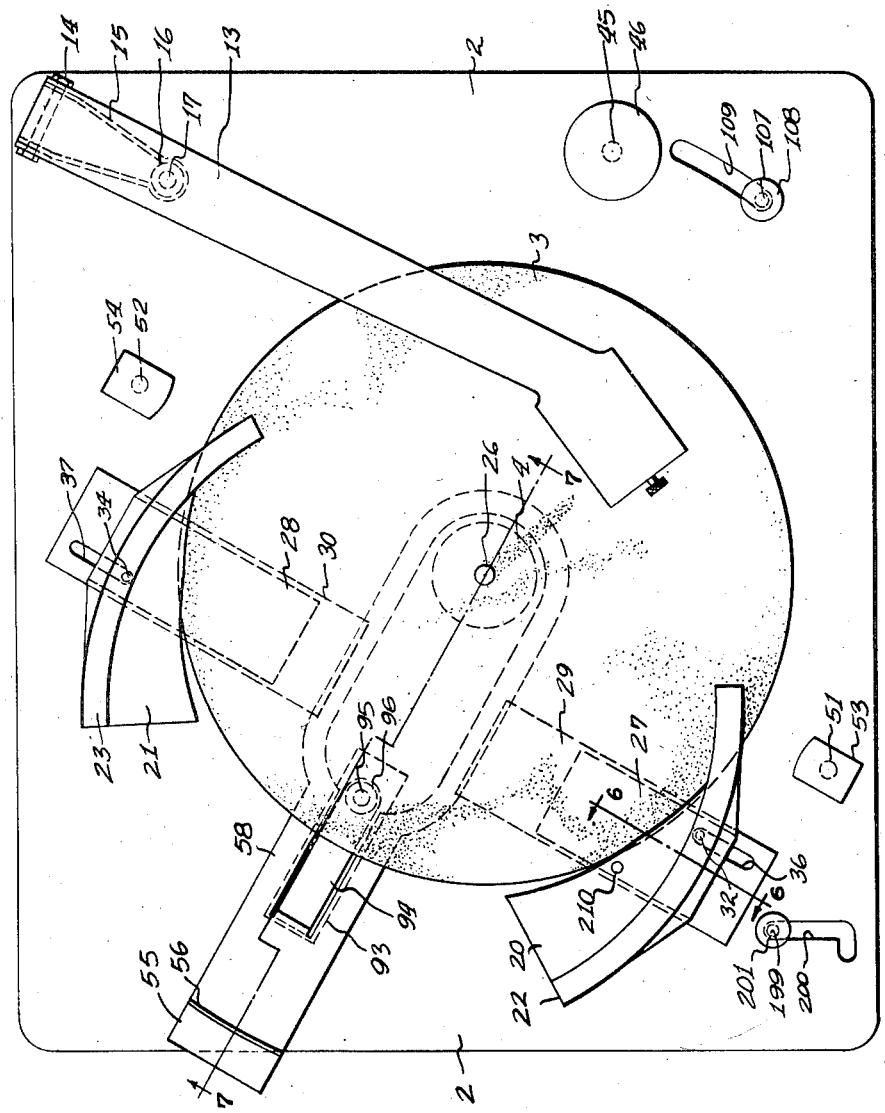

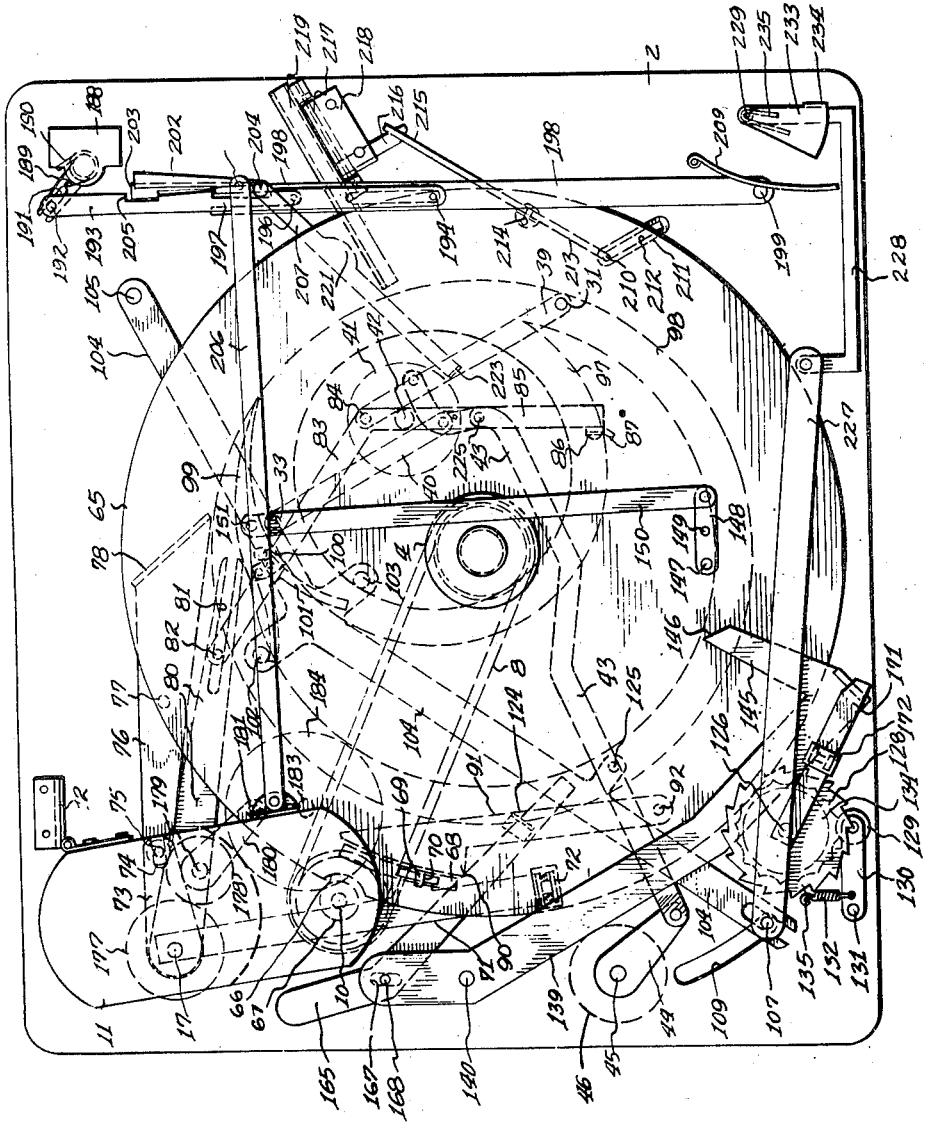

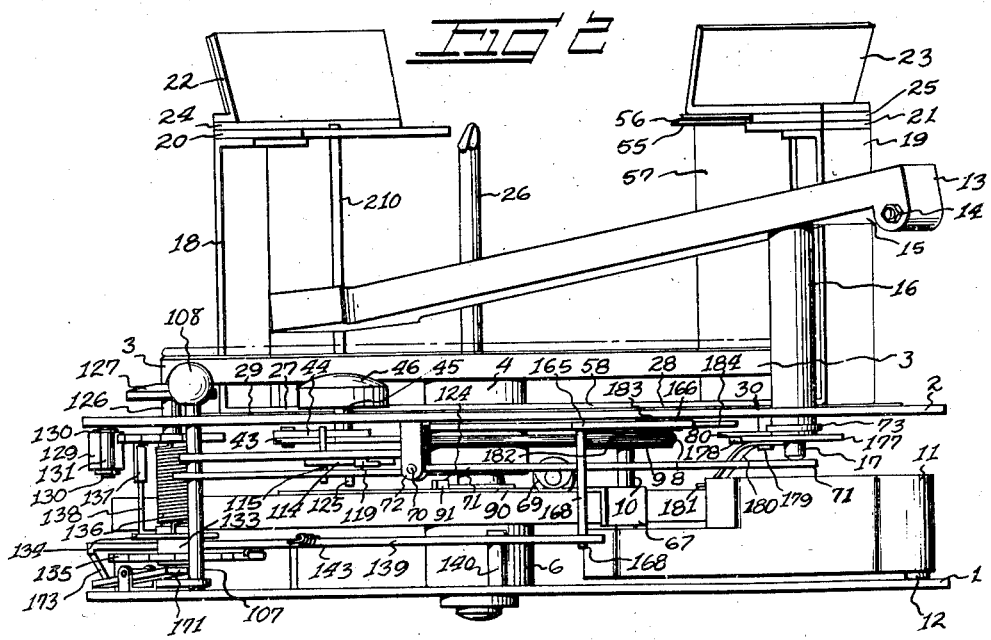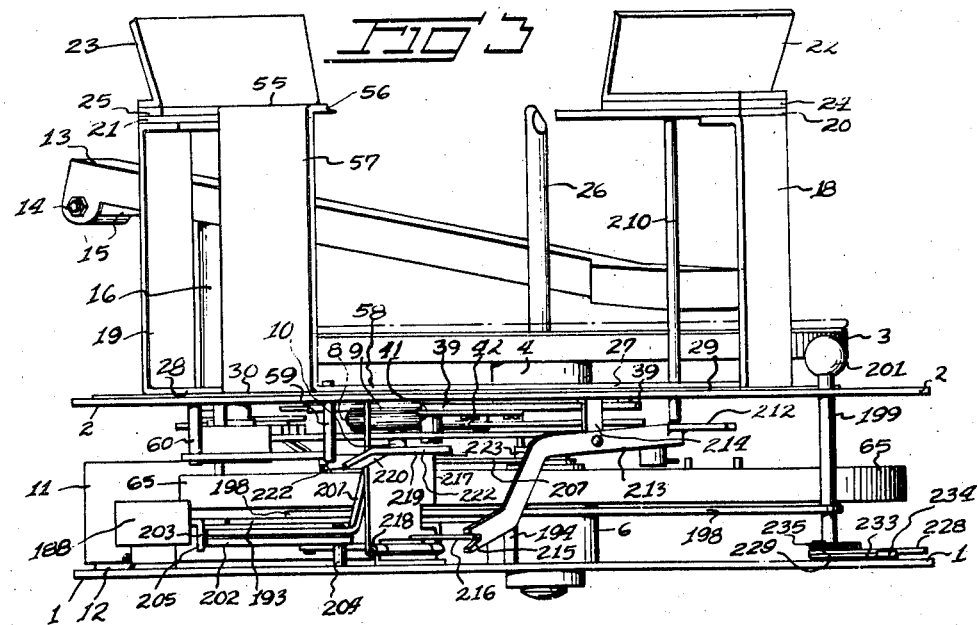

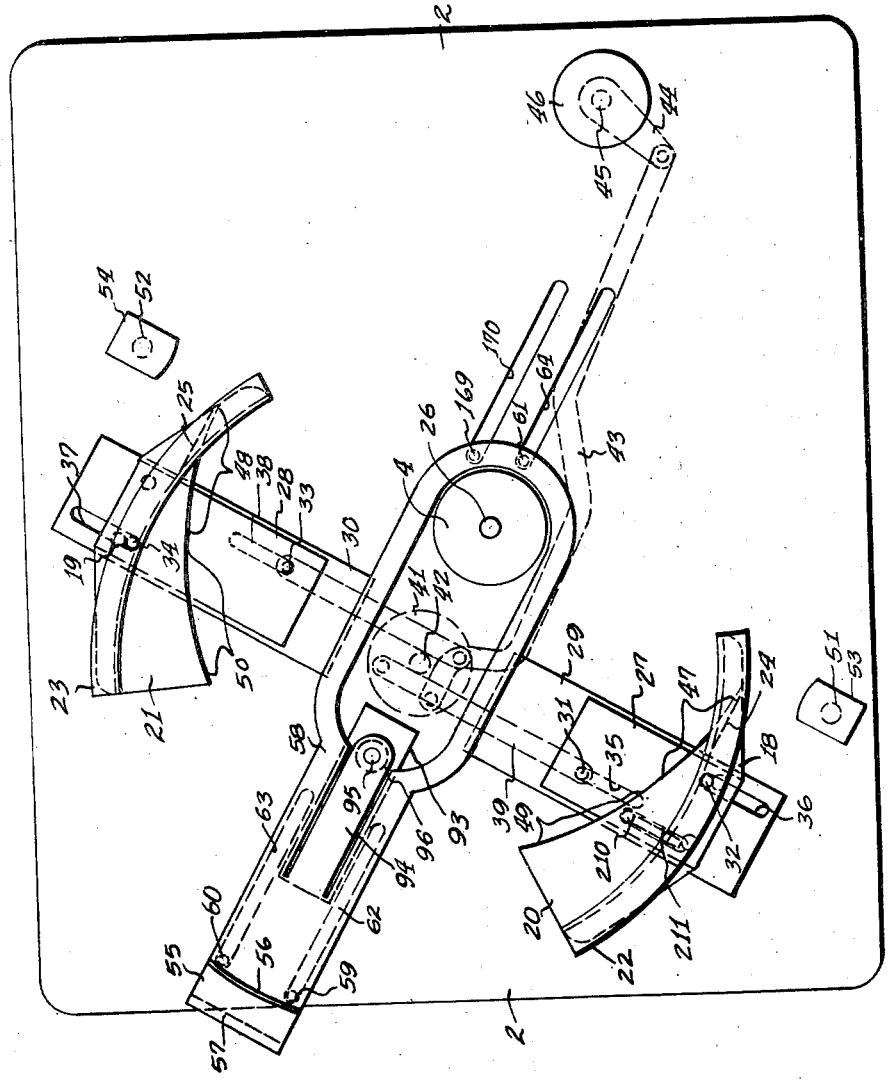

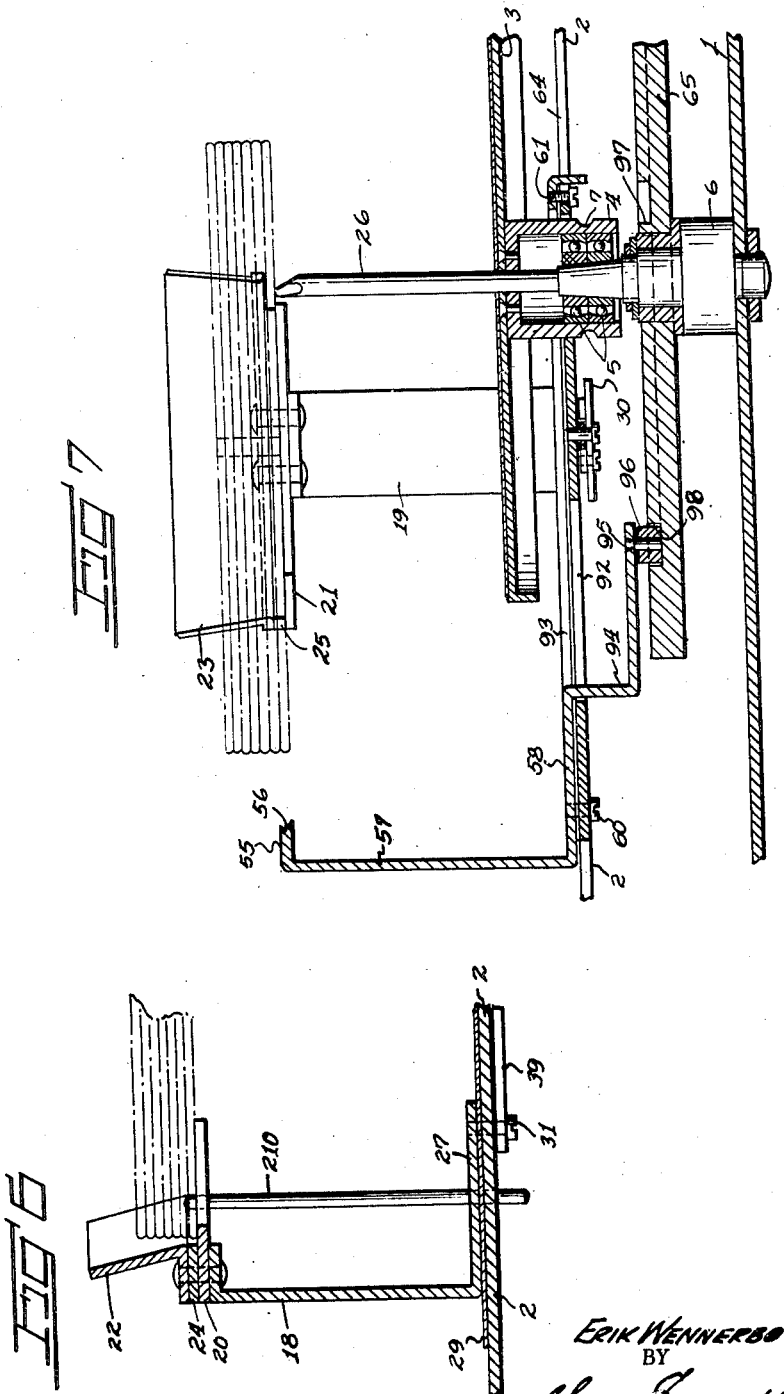

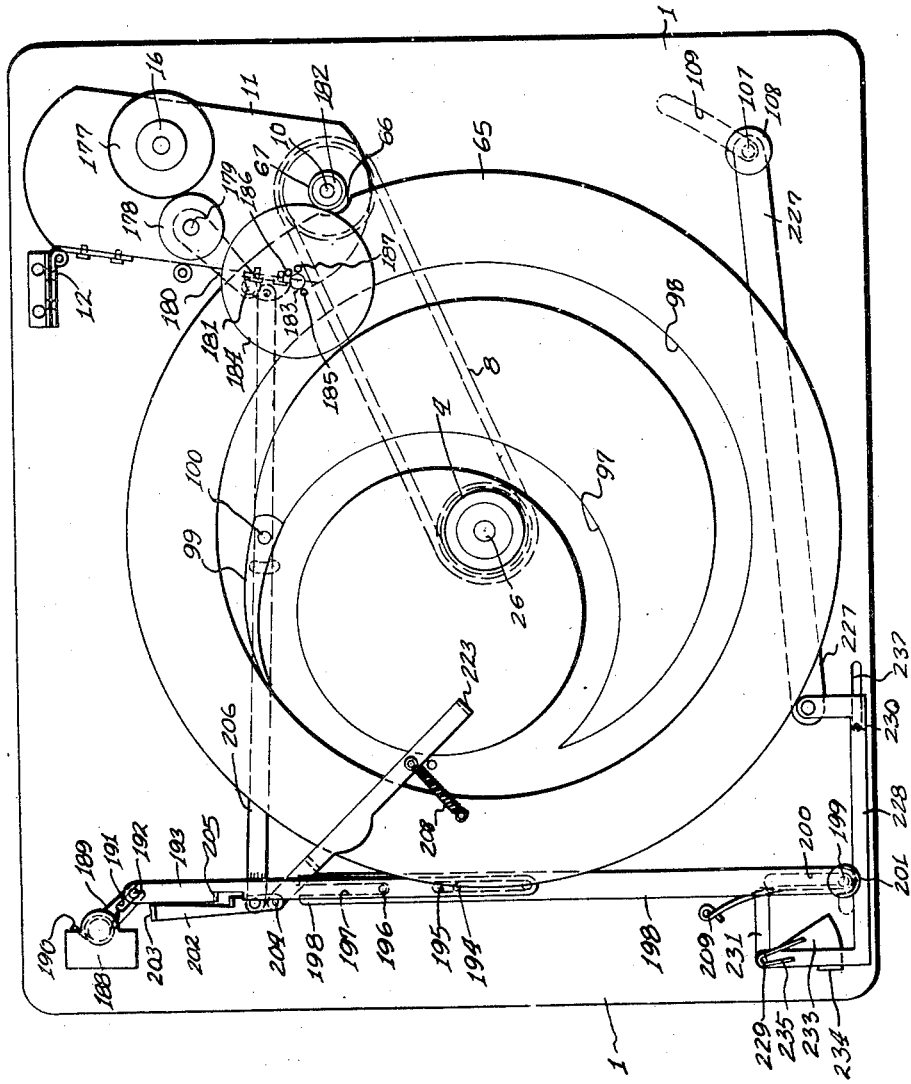

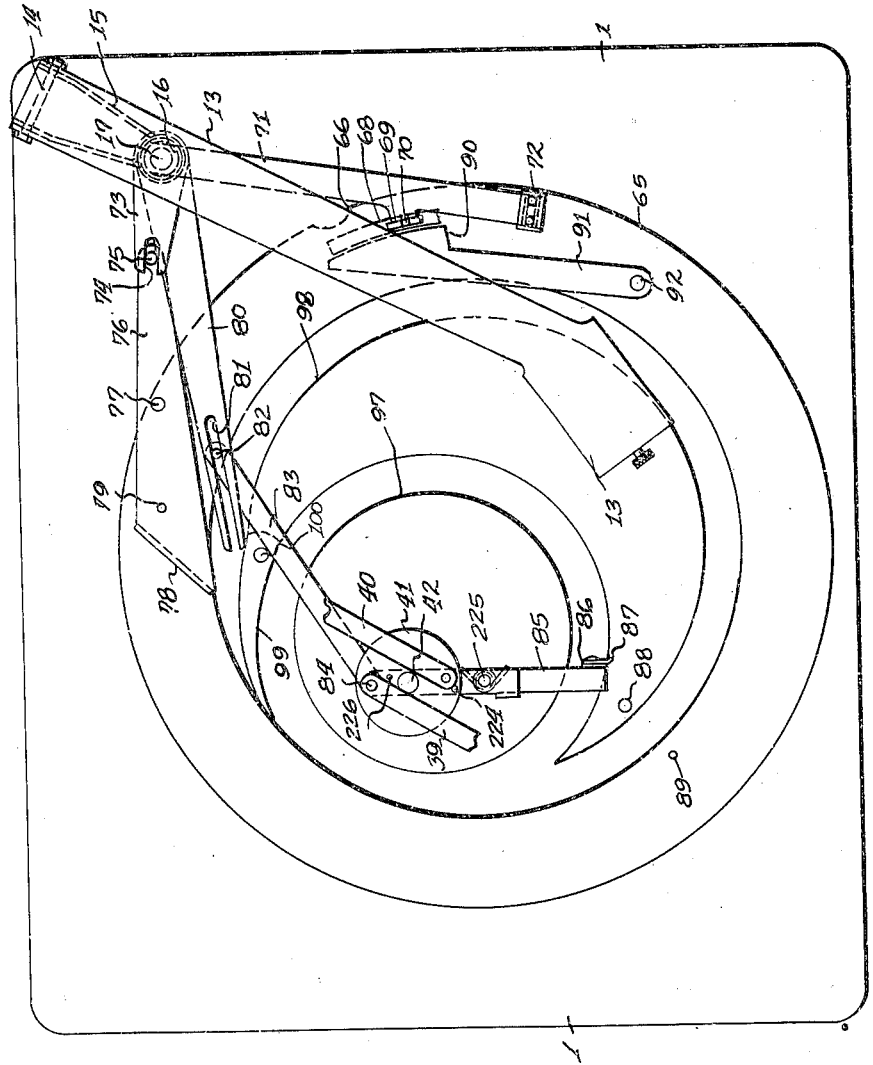

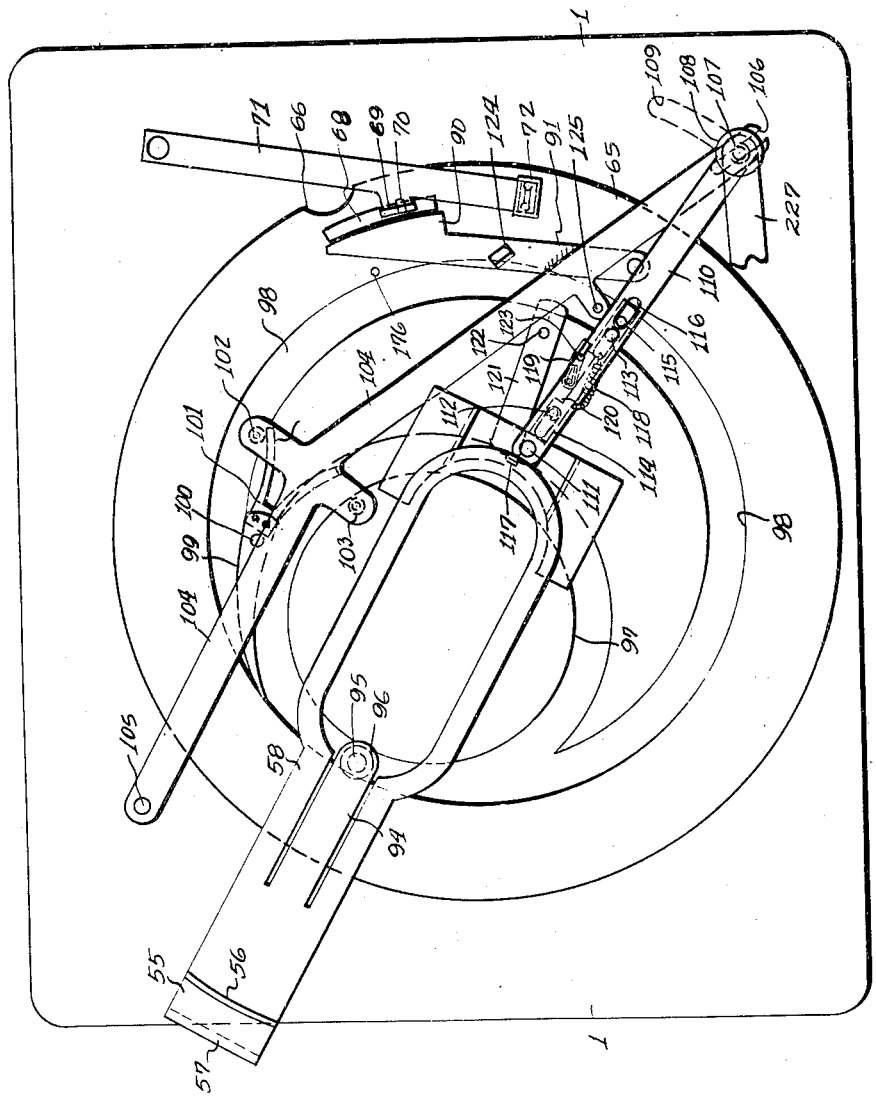

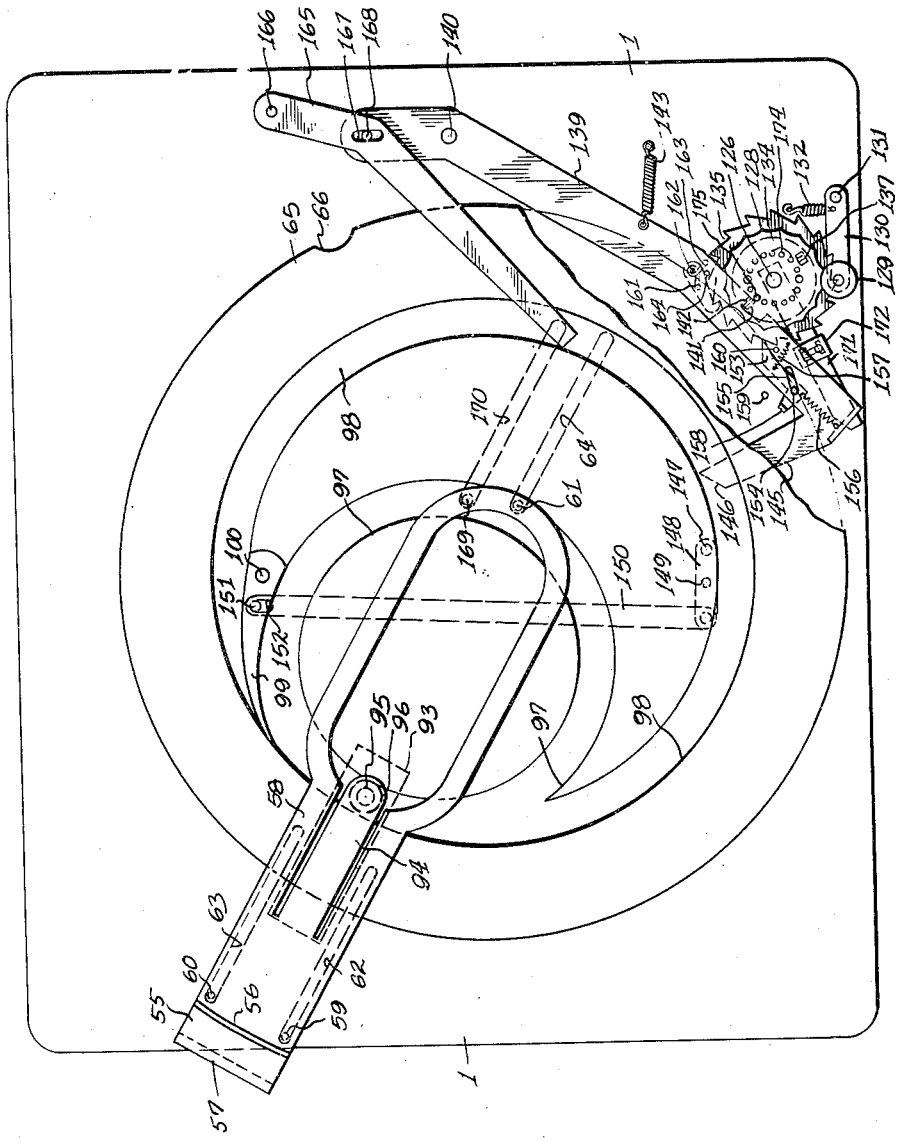

Patented Nov. 1, 1949

2,486,898

UNITED STATES PATENT OFFICE 2,486,898

MAGAZINE PHONOGRAPH

Erik Wennerbo and Helge Norén, Motala, Sweden, assignors to Axel Harald Holstensson, Motala, Sweden Application November 29, 1943, Serial No. 512,184
In Sweden September 24, 1942

Section 1, Public Law 690, August 8, 1946
Patent expires September 24, 1962

17 Claims. (Cl. 274—10)

This invention refers to record changing phonographs of the type in which a record changing member is actuated for bringing a new record to be played into a position for reproduction by a control or cam disc which is rotated one revolution for every record changing operation.

According to the invention the control or cam disc is provided with a track along which a control member of the record changing mechanism travels in order to impart to the record changing member during the rotation of the control disc the movement necessary for the record; the control disc being also provided with a further track, which at one point touches or coincides with the first mentioned track and along which the control member may also travel, whereby, however, no record changing movement is transferred to the record changing member, and finally with switch means e. g. a switch blade which, depending upon the position causes the control member to travel along the one track or the other, when the control disc or the like begins to rotate.

The invention will now be described with reference to the accompanying drawings, in which:

Fig. 1 is a plan view of the phonograph as seen from above.

Fig. 1A is a view of the phonograph similar to Fig. 1 showing only the full-line parts.

Fig. 1B is a plan view of the phonograph as seen from the bottom.

Fig. 2 shows a phonograph as seen from the right side of Fig. 1,

Fig. 3 is a side view as seen from the left hand of Fig. 1,

Fig. 4 shows details of the record changing mechanism as seen from above,

Fig. 5 shows the same details as those shown in Fig. 4 but in another operative position, Fig. 6 shows a section taken through one of the supporting members of the stack of records along the line I—I in Fig. 4, Fig. 7 shows a section through the phonograph taken along the line II—II in Fig. 4 illustrating details of the record changing mechanism, Fig. 8 is a plan view of the phonograph with details of the starting and stopping means, Fig. 9 is a plan view showing details of a mechanism for controlling the tone arm movements, Fig. 10, is a plan view of details of a repeating mechanism, Fig. 11 is a plan view of details belonging to a device for delaying the change of records.

Like parts are designated by like reference numerals throughout the specification. Referring now to the drawings 1 designates a base plate and 2 a cover plate that is fixed in spaced relationship to the base plate by means of spacing members not shown in the drawing. Between the base plate and the cover plate 2 are the parts necessary for the functioning of the phonograph, and above the cover plate 2 are the reproducing means, the record changing means and the manipulating means.

The reproducing means comprise a turntable 3 arranged on a hub 4 that is rotatably mounted by means of ball bearings 5 on a pin 6 fixed in the base plate 1. The hub 4 is provided with a groove 7 in which runs an elastic belt 8. The belt 8 also runs over a grooved pulley 9 mounted on the shaft 10 of an electric motor 11. The motor is fixed to the base plate 1 by means of a hinge 12. A tone arm 13 is rotatably mounted on a horizontal axle 14 fixed in a stirrup 15 that is fastened to a sleeve 16 extending through the cover plate 2 and serving as the vertical axle of rotation of the tone arm. Through the sleeve 16 extends a pin 17 that may be displaced in an upward direction in the sleeve, whereby the upper end of the pin 17 comes into contact with the tone arm 13 and lifts the latter.

At either side of the turntable 3 is a standard 18 and 19 respectively each of which at its upper end carries a supporting plate 20 and 21 respectively and guide plate 22 and 23 respectively. Between the supporting plates 20 and 21 and the guide plates 22 and 23 respectively are intermediate plates 24 and 25 respectively. The supporting plates 20 and 21 and the guide plates 22 and 23 constitute the bottom and sides respectively of a container in which a stack of records to be played may be placed. The intermediate plates 24 and 25 are shaped in such a way that the undermost record of the stack may be displaced in a direction toward the centre of the turntable 3. When the record has attained concentricity with the turntable it ceases to be in contact with the supporting plates 20 and falls down onto the turntable, whereby its central aperture surrounds an extension 26 projecting in an upward direction from the axle 6, said extension thereby centering the record whilst it is being played.

The standards 18 and 19 are displaceable in a direction towards and away from each other, which enables the record container constituted by the supporting plates 20 and 21 and the guide plates 22 and 23 to be adjusted to records of various sizes. Figs. 4 and 5 show this arrangement. The standards 18 and 19 are bent at their respective lower ends to form horizontal portions 27 and 28 respectively. (See also Fig. 6.) The horizontal portions 27 and 28 respectively are adapted to engage the cover plate 2 with the intermediary of two pieces of spring steel 29 and 30 respectively for reducing the friction at the displacement of the standards. The standards are adapted to be in engagement with and be guided in relation to the cover plate 2 by means of bolts 31 and 32, 33 and 34 respectively which pass through slots 35, 36 and 37, 38 respectively provided in the cover plate 2.

To the bolts 31 and 33 are connected two rods 39 and 40 whose ends remote from the standards are connected to a rotatable disc 41 by means of pivots. The disc 41 is rotatably mounted on a pivot 42 that is provided on the underneath side of the cover plate 2.

To the disc 41 is also connected one end of a rod 43 whose other end is connected to an arm 44 that is rigidly mounted on a rotatable shaft 45 that passes through the cover plate 2 above which it is provided with an operating knob 46. See Figs. 1, 4 and 5. When the operating knob 46 assumes the position shown in Fig. 4 the standards 18 and 19 are relatively near one another and the magazine is in this position adjusted for receiving a stack of records of relatively small diameter. When the lowermost record of such a stack of records is laterally displaced and immediately before the central aperture of the record coincides with the centre of the turntable the edge of the record will coincide with the parts 47 and 48 of the edges of the supporting plates 20 and 21 respectively shaped in accordance with the periphery of a small record. (See Fig. 4.)

When the operating knob is turned in a counterclockwise direction from the position shown in Fig. 4 to the position it is shown to assume in Fig. 5 it causes the standards 18 (by means of the rod 43, the disc 41 and the rods 39 and 40) to be displaced from one another to the position shown in Fig. 5. The magazine is now adjusted to accommodate a stack of records of relatively large diameter. When the lowermost record of such a stack is displaced in a direction towards the turntable and immediately before concentricity of the record with the turntable is attained the edge of the record will coincide with the parts 49 and 50 of the edges of the supporting plates 20 and 21 respectively which parts are shaped in accordance with the periphery of a relatively large record. (See Fig. 5.)

It will therefore be apparent that no matter whether the magazine be adjusted for the accommodation of and loaded with records of large or small diameter, the undermost record on lateral displacement thereof in a direction towards the turntable will be effectively supported by the two supporting plates 20 and 21 almost until concentricity between the record and the turntable is attained. Immediately before or on attainment of concentricity the record leaves the two supports 20 and 21 simultaneously, whereby the records lying over the same in the stack will fall down onto the said supporting plates. In order to give the undermost record a third point of support the central post 26 of the turntable may, as is the case in the present example, (see for instance Fig. 7), be given such a length that it extends to the undermost record of the stack. The upper end of the post 26 is preferably rounded off so that it may not scratch the record during the displacement of the latter. The post 26 is suitably provided with an inclined chamfer so that the central aperture of the record comes into safe guiding engagement with the post before the record ceases to be in contact with the supporting plates 20 and 21.

The intermediate plates 24 and 25 serve to guide the lowermost record in a direction at right angles to its direction of displacement. Figs. 4 and 5 show how the said intermediate plates are linearly cut in the direction in which the records are displaced, whilst they are curved so as to correspond to the periphery of the records in the other direction. They therefore permit the record to be displaced between them in one direction whilst serving as a guide for this record.

As the intermediate plates 24, 25 and the guide plates 22, 23 are curved in such a way as to correspond to a relatively small record, they will not exactly fit the periphery of a larger record. The guiding of such a record at right angles to its direction of displacement would therefore not be so exact as the case is with the smaller record. It has therefore proved to be advantageous to provide two extra record guides comprising columns 51 and 52, which, at their upper ends, carry guide plates 53 and 54 lying in the same plane as the intermediate plate 24, 25 and whose mutually opposed edges are spaced from one another at a distance corresponding to the diameter of a large record. These extra record guides serve only to guide large records.

The guide plates 22 and 23, as may be seen from the drawings, are shaped as portions of a conical surface with downwardly projecting apex. As shown in the drawings the guide plates 22 and 23 are shaped in such a way as to retain all records except the lowermost one of the stack. Only the undermost record can be laterally displaced, during which displacement it passes underneath the guide plates.

Means for actuating the lowermost record of the stack comprise an upper horizontal member 55 with a groove 56 for engaging the edge of the lowermost record of the stack (see especially Fig. 7). The means comprise further a vertical portion 57 and a horizontal lower portion 58 which rests on the cover plate 2 and is displaceably mounted thereon, suitably with an intermediate leaf of spring steel in order to reduce friction.

The member 55, 57, 58 is guided on the cover plate by means of guide pins or bolts 59, 60, 61 which slide in slots 62, 63 and 64 in the cover plate 2.

Besides the pulley 9 which actuates the turntable 3 by means of a belt 8 the shaft 10 of the motor 11 is also provided with a friction roller 67 which may come into engagement with the edge of a wheel 65 concentric with the turntable and rotatably mounted upon pin 6 and may also run free in a recess 66 provided in the edge of the wheel 65.

By means of a device that will be more particularly described hereinafter the wheel 65, when rotating, performs the lifting, the swinging out, the swinging back and the lowering of the tone arm as well as the depositing of a new record onto the turntable.

The means effecting the movements of the tone arm are shown in detail in Fig. 9. In the wheel 65 there is provided a groove 68 in which a roller 69 normally rests. The roller 69 is mounted on a pivot 70 that is fixed to a projection of an arm 71, the one end of which is mounted in a stirrup 72 fastened to the underneath side of the cover plate 2. (See also Fig. 2.) The other end of the arm 71 constitutes a support for the pin 17 that serves to lift the tone arm.

When the wheel 65 rotates, the roller 69 leaves the groove 68 and rolls onto the upper surface of the wheel. The arm 71 is then lifted and pushes the pin 17 in the sleeve 16 in an upward direction, the tone arm 3 being thus raised from the record with which the needle of the tone arm has been in contact. The sleeve 16 is provided at its lower end with an arm 73, the free end of which is provided with a recess 74 in which a pin 75 engages. The pin 75 is fixed to another arm 76 that is mounted on a pivot 77 in the cover plate 2. The left hand end of the arm 76 is obliquely bent downwards forming an oblique downwardly projecting edge portion 78. A pin 79 is mounted on the wheel 65 in such a way that when the wheel 65 is rotating, it may engage the edge portion 78 of the arm 76 and thus swing the arm 76 in a clockwise direction. In such case the arm 75 swings counterclockwise, the tone arm also being swung counterclockwise, i. e. it is swung in such a way that it leaves the turntable.

At the lower end of the sleeve 16 is also fixed an arm 80, the free end of which is provided with a longitudinal slot 81, in which a pin 82 engages. The pin 82 is fixed to an angular arm 83 rotatably mounted at its apex on a pin 84 that is fastened in the disc 41, serving in a manner hereinbefore described, when the supports of the stack of records are adjusted. The other leg 85 of the angular arm 83 is provided at its free end with a downwardly bent edge portion 86 to which is riveted a resilient wire 87. When the supports for the stack of records are adjusted for receiving a stack of small records, the arm 83 assumes the position in relation to the other parts shown in Fig. 9. In this case, when the tone arm is swung out, the downwardly projecting edge portion 86 lies in the path of motion of a pin 88 fixed to the wheel 65. Therefore, when the wheel 65 rotates, the pin 88 will engage the edge portion 86 and swing the arm 85, 83 counterclockwise about its bearing 84, the arm 80 together with the tone arm being swung clockwise, i. e. the tone arm is swung in over the turntable. The position of the pin 88 in relation to the groove 68 is determined in such a way that the needle of the tone arm is lowered onto the record outside the sound groove of a small record. When the needle contacts the edge of the record, the pin 88 will come into touch with the resilient wire 87, a gentle impulse being then imparted to the tone arm so that the needle will slide into the first convolution of the sound groove.

When the disc 41 is turned by means of the knob 46 in such a way that the supports for the stack of records are adjusted for receiving a stack of larger records (Fig. 5), the pin 82 of the arm 83 will slide to the left in the slot 81 of the arm 80. The part 85 of the arm together with the edge portion 86 will be pushed downwards (Fig. 9). The edge portion 86 will then leave the path of motion of the pin 88 and will pass into the path of motion of another pin 89 instead, the position of the pin 89 on the wheel 65 being such that the tone arm is swung in and lowered onto the edge of a large record, whereafter, by actuation of a spring 87 by the pin 89, it will receive a gentle push that will cause the reproduction needle to move into the first sound groove of the large record.

The groove 68 in the wheel 65 serving for the raising and lowering of the tone arm may be covered by a flap member 90 constituting a part of an arm 91 that is mounted on a pivot 92 fixed in the wheel 65. The purpose of this is to obtain repetition and delay which will be referred to hereinafter.

The means for changing records are illustrated in Figs. 4, 7 and 11.

The horizontal portion 58 of the member 55, 57, 58 is provided with a blade 94 lying under the cover plate 2 and extending through a slot 93 therein, a pivot 95 being provided on the free end of the blade 94. On the pivot 95 is mounted a roller 96 running in a groove or track 97 of the wheel 65.

The groove 97 in the wheel 65 is located eccentrically so that, when the wheel 65 rotates (counterclockwise), the roller 96 and with it the member 55, 57, 58 is first moved to the right (Fig. 7), the groove 56 engaging the edge of the lowermost record of the stack and displacing this record to the right until its central aperture coincides with the central post 26, when the record will be deposited onto the turntable.

On continued rotation of the wheel 65 the member 55, 57, 58 will return to its starting position.

In the wheel 65 there is provided a groove or track 98 besides the groove or track 97. The groove 98 is circular and concentric with the axle of the wheel. The grooves 97 and 98 merge into one another at a point where the roller 96 is in its position of rest.

A switch blade 99 is rotatably mounted on a pivot 100. Depending upon the position of the switch blade the roller 96 will be directed into one or the other of the grooves 97 and 98, change of records taking place, when the roller is directed into the groove 97, whereas no change will take place, when the roller is guided into the groove 98. Thus, in the latter case, only the motion of the tone arm takes place, for which reason the record played last will be repeated.

The repetition means are shown in detail in Fig. 10. The switch blade 99 is provided with a forked member 101 that brings about the switching of the switch blade first, every time the roller passes through any of the grooves 97 or 98, and secondly, when the fork 101 comes into contact with either one of the two pins 102 and 103 provided on an arm 104. The arm 104 is rotatable about a pivot 105 fixed in the cover plate 2.

The free end of the arm 104 is provided with a slot 106 surrounding a pin 107 that is provided with a manipulating knob 108 situated above the cover plate 2. The pin 107 slides in slots 109 provided in the cover plate 2 and the bottom plate 1 and is fixed in an arm 110 that is pivoted at 111.

Fig. 10 shows the details adjusted for changing records after each record has been played once, i. e. without repetition. The starting position is that shown in Fig. 10. At the commencement of the record changing movement the wheel 65 begins to rotate counterclockwise. Thereby the roller 96 is directed by the switch blade 99 into the eccentric groove 97, for which reason the changing movement takes place as described above. When the fork 101 passes the roller 96, the latter actuates the fork prong lying partly above the groove 97 and thereby switches the blade 99 over to its other position. On completion of one revolution of the wheel 65, the other prong of the fork 101 will engage the pin 102 and thereby switch the blade over to its original position. When the wheel 65 has completed one revolution, all members will have therefore returned to their original positions.

If the manipulating knob 108 is pushed from its position as shown in Fig. 10 upwardly to a position in the middle of the slot 109, the phonograph will be set for playing every record twice before the following record is deposited onto the turntable. In this position the pins 102 and 103 assume such a position with respect to the fork 101 that the latter is not actuated. The blade is now controlled only by the roller 96 which on every revolution of the wheel 65 engages one of the prongs of the fork 101. At every alternate revolution, the roller 96 will be directed into the groove 97, whereby a change of records takes place, and every other revolution, into the groove 98, whereby no new record is deposited, but instead thereof, the record last played will be repeated.

Every time the roller 96 passes through the concentric groove 98 it will, however, engage the arm 91 which carries the flap member 90. The arm 91 partly covers the groove 98, as shown in the drawing, and is pushed aside by the roller 96, when the latter is passed. Therefore the flap member 90 will cover the groove 69 (for purposes of delay which will be described later) and must therefore be removed from the groove so that the tone arm 3 may be lowered onto the record for re-playing the latter. For this purpose the arm 110 is provided with a slide 114 slidable on two limiting pins 112 and 113, the slide being provided with a pin 115 which extends partly downwards under the slide 114 and partly upwards through a slot 116 in the arm 110. When the manipulating knob 108 assumes its position in the middle of the slot 109, the upward extending part of the pin 115 will lie in the path of motion of a downwardly extending stud 117 situated on the horizontal portion 58 of the member 55, 57, 58. This stud 117 slides in the slot 64 of the cover plate 2.

Every time the roller 96 is guided into the eccentric slot 97 the stud 117 will engage the pin 115, whereby the slide 114 is urged to the right putting a spring 118 under tension. A pawl 119 provided on the arm 110 then engages a recess 120 in the slide 114 and locks the slide in its right hand position. The arm 91 is not actuated, for which reason the next record will be played on completion of the changing operation. When the wheel 65 is started anew after a record has been played the roller 96 will be guided into the concentric groove 98. Now the arm 91 will first pass the roller 96 whereby the slot 69 is covered by the flap member 90. Then a rod 121 will pass the roller 96. The rod 121 is slidably mounted between the two grooves 97, 98, so that one of its ends may project in one groove or the other respectively, and, on rotation of the wheel 65, be urged by the roller 96 towards that groove in which the roller is not rolling. When, as in the case in question, the roller 96 rolls in the concentric groove 98, the rod 121 is urged in such a manner that a pin 122 on the rod is given a path of motion in which lies a pin 123 fixed to the pawl 119. On continued rotation of the wheel 65 a part 124 stamped out in the arm 91 and bent upwards so as to take an inclined position will engage with its front edge the downwardly projecting part of the pin 115, whereby the pin sliding along the surface of the projection 124 will turn the arm 91 counterclockwise, so that the flap member 90 again uncovers the groove 69. The pin 122 will then engage the pin 123, whereby the pawl 119 is rotated counterclockwise and the slide 114 snaps back into the position shown in Fig. 10.

If the manipulating knob 108 is pushed to the end of the slot 109 opposite to that in which it is shown in the drawings, the mechanism is set for continuous repetition of one and the same record. In this position the pin 103 on the arm 104 will engage one shank of the fork 101 for which reason the switch blade is switched over on termination of every revolution of the wheel 65 so that the roller is always guided into the concentric groove 98. Thus no change of record takes place. For every revolution of the wheel 65 the flap member 90, however, is moved over the groove 69, but is removed again by a pin 125 mounted on a projection of the arm 104, which pin only in this position of the manipulating knob 108 lies in the path of motion of the projection 124 with which it comes into engagement.

Means for increasing the interval between two consecutive playings (delaying means) are shown in detail in Fig. 11.

A shaft 126 mounted in the cover plate 2 is provided with an operating knob 127 which is situated on the upper side of the cover plate 2 (see Fig. 2). Immediately underneath the cover plate 2 and on the shaft 126 is fastened an indicating wheel 128 with specially shaped teeth. An indicating roller 129 is mounted between two arms 130, that are rotatably mounted on a common shaft 131 fixed to the cover plate 2. The indicating roller 129 is held in mesh with the indicating wheel 128 by means of a helical spring 132 whose one end is fastened in the upper arm of the arms 130 and whose other end is fastened to the cover plate 2 (not shown in Fig. 2). The shaft 126 is provided at its lower end with a loosely fitting sleeve 133. On this sleeve are mounted a disc 134 and underneath the latter a ratchet wheel 135. A helical spring 136 is wound around the axle 126 with its one end fastened to the disc 134, its other end being fastened to the indicating wheel 128. The helical spring 136 tends to rotate the sleeve 133 with the disc 134 and the ratchet wheel 135 counterclockwise with respect to the indicating wheel 128. On the underneath side of the indicating wheel 128 is fastened an angular element 137 and on the upper surface of the disc 134 is provided a pin 138, which, by engaging the angular element 137 limits the rotation of the sleeve 133 with respect to the indicating wheel 128.

An arm 139 is rotatably mounted on a bolt 140 fastened to the bottom plate 1. The arm 139 is provided at 141 with projection formed by an upwardly bent stamped out part. The projection 141 engages the periphery of the disc 134 and lies in the position shown in Fig. 11 in engagement with a recess 142 in the periphery of the disc 134. A spring 143 tends to rotate the arm 139 counterclockwise and thus holds the projection 141 in engagement with the disc 134. The arm 139 is also provided with a projection 145 which extends underneath the disc 65, as shown in Fig. 11. This projection 145 has an obliquely cut end surface 146, which, in the position of the arm 139 show in Fig. 11, is situated in the path of motion of a pin 147, projecting from an arm 148, which is rotatably mounted at 149 on the wheel 65. To the opposite end of the arm 148 is linked the one end of a rod 150 whose other end is linked to the switch blade 99 by means of a pin 151, that extends through the wheel 65 through a slot 152, Mounted on the arm 139 to mesh with the teeth of the ratchet wheel 135 is a feeder 153. The feeder 153 is guided by a pin 154 mounted thereon and sliding in a slot 155 in the arm 139. A helical spring 156 tends to move the feeder 153 in a downward direction to the left and another helical spring 157 tends to rotate the feeder 153 clockwise to hold its apex in mesh with the teeth of the ratchet wheel 135. The feeder 153 is also provided with a projection 158, the outer end of which is upwardly bent so that in a certain position of the arm 139 the upwardly bent end will lie in the path of motion of a pin 159, that is fixed to the underneath surface of the wheel 65 and receive an impulse from the pin 159 every time the wheel 65 performs a complete revolution, whereby the element 163 rotates the ratchet wheel 135 by one tooth in feeding direction. The arm 139 is provided with a pin 160 that may be engaged by the feeder 153 when the arm 139 is in such a position that the apex of the element 153 is not in mesh with the teeth of the wheel 138. A pawl 161 is mounted on a pin 162 of the arm 139. In the position of the arm 139, as shown in Fig. 11, the pawl actuated by a spring 163 engages the teeth of the ratchet wheel 135 and locks the wheel against counterclockwise rotation. In another position of the arm 139 the pawl 161 engages a pin 164 and is then moved out of engagement with the teeth of the wheel 135.

The arm 139 is linked to another arm 165, that is rotatably mounted on a bolt 166 fastened in the cover plate 2 of the phonograph (see also Fig. 2). The arm 165 is provided with a slot 167 in which engages a pin 168 fastened on the arm 139. The end of the arm 165 remote from the pivot 166 lies in the path of motion of a pin 169 that is fastened onto the underneath side of the member 55, 57, 58 and slides in a slot 170 provided in the cover plate 2.

Every time a record is changed, the arm 165 actuated by the pin 169 will therefore be rotated counterclockwise about the bolt 166, the arm 139 being rotated clockwise by means of the slot 167 and the pin 168. The lower end of the arm 139 (Fig. 11) is thereby raised so that the projection 141 disengages the recess 142 in the disc 134 and, besides this, both feeder 153 and the pawl 161 disengage the teeth of the wheel 145 so that the wheel 145 and the disc 134 then become free.

Underneath the shaft 126 extends the one end of an arm 171 mounted in a stirrup 172 that is fastened to the bottom plate 1. The other end of the arm 171 is in engagement with the oblique end surface 173 (see Fig. 2) of a downwardly bent portion of the lower end of the arm 139. The indicating wheel 128 is provided with a series of perforations 174, the number thereof being equal to the number of teeth of the wheel 128. A pin 175 fastened to the cover plate 2 projects downwards and into one of these perforations 174.

When the wheel is to be rotated by means of the manipulating knob 127 the latter must therefore first be depressed, whereby the perforation 174 into which the pin 175 projects disengages the pin, so that the knob 127 together with the indicating wheel 129 may be rotated. When the wheel 127 is depressed the arm 171 engages the oblique surface 173 of the arm 139 and rotates the latter clockwise, so that the projection 141 disengages the recess 152 in the disc 134 and the feeder 153 as well as the pawl 161 disengage the teeth of the ratchet wheel 135. Therefore, when the knob 127 is rotated, both the indicating wheel 128 and the disc 134 together with the ratchet wheel 135 will rotate.

In the position shown in Fig. 11 the delaying means are inoperative, i. e., they are adjusted for the shortest possible interval between the playing of two records. When delay is desired, the manipulating knob 127, after being depressed, is rotated counterclockwise one or more steps according to the length of interval desired between two consecutive playings. Let us assume that the manipulating knob with the indicating wheel 128 is rotated four steps in counterclockwise direction. After the arm 139 on depression of the knob during rotation thereof has been raised out of engagement with the wheels mounted on the axle 126, the arm will fall back with the projection 141 resting against the edge of the disc 134 when the manipulating knob, after rotation is allowed to reassume its upper position. The obliquely cut surface 146 of the projection 145 then lies in the path of motion of the pin 147. When the wheel 65 begins to move, the arm 148 will be rotated counterclockwise when the pin 147 engages the surface 146, the switch blade 99 therefore being switched over by means of the rod 150 so that the roller 96 is guided into the concentric groove 98. No change of record therefore takes place during this first revolution of the wheel 65. During the revolution the roller 96 engages the arm 91 of the flap member 99 (Fig. 10), and thereby causes the flap member to cover the groove 69, so that on completion of the revolution the tone arm is not lowered onto the record. (The knob 108 for manipulating the repeating device is assumed not to be adjusted for repetition so that the pin 115 is not lying in the path of motion of the projection 124).

Towards the end of the revolution the pin 159 (Fig. 11) engages the projection 158 provided on the feeder 153, and urges the latter towards the right, so that the ratchet wheel 135 is rotated by one tooth in feeding direction.

On the completion of a revolution of the wheel 65, the friction roller 67 will again come opposite the recess 66. The wheel 65 then stops, but starts again immediately by means of a device (tap-tap device) which will be described hereinafter. During the following revolution of the wheel 65 the same procedure is repeated as that just described and the ratchet wheel 135 is again rotated by one tooth in feeding direction. A third revolution of the wheel 65 proceeds in exactly the same way. During the fourth revolution of the wheel 65 the fourth tooth of the ratchet wheel 135 is actuated, whereby the ratchet wheel together with the disc 134 reassume the position they had before the adjustment of the delay means. Thereby the arm 139 reassumes its position as shown in Fig. 11, the obliquely cut surface 146 leaving the path of motion of the pin 147. During the fourth revolution the roller 96 will have passed through the outer concentric groove 98 said roller having been in engagement with the outer prong of the fork 101 (see Fig. 10) so that the switch blade 99 at the end of this revolution reassumes the position shown in Fig. 11. On commencement of the fifth revolution no switching over of the switch blade 99 takes place, because the pin 147 does not come into contact with the surface 146. The roller 96 is therefore guided into the eccentric groove 97, whereby a change of records takes place. During the changing of records the pin 169 engages the arm 165, the arm 139 thereby being raised from the wheels 135, 134 as hereinbefore described. The wheel 135 together with the disc 134 thereby return to the position into which they were originally adjusted by the action of the spring 136 (Fig. 2) which is stretched at the feeding rotaton of the ratchet wheel 145 during the period of delay. On the return of the wheel 135 and the disc 134, the pin 138 will again engage the angular element 137 which it has left at the feeding rotation of the ratchet wheel during the period of delay.

At every revolution of the wheel 65 a pin 176 (Fig. 10) mounted on the cover plate 2 will engage the projection 124 of the arm 91, so that the flap member 90 is drawn from the groove 69. During those revolutions, when the roller 96 rolls in the outer concentric groove 98, the flap member 90 is again urged by the roller to obstruct the groove 69, but during the record changing revolution of the wheel 65, when the roller 96 rolls in the inner eccentric groove 97, the flap member 90 is held in a position in which it does not obstruct the groove 67.

On completion of the fith or record changing revolution of the wheel 65 the freshly deposited record is played. When this record has been played the wheel 65 is again started in a manner hereinafter described, and is allowed to complete four revolutions before the next change of records takes place.

It will therefore be understood that when the manipulating knob 127 is rotated four steps in counterclockwise direction there will be an interval between every change of records, such interval being equal to the time which the wheel 65 takes to complete four revolutions. In an analogous way a delay corresponding to $n$ revolutions will take place when the manipulating knob 127 is rotated by $n$ teeth in counterclockwise direction. It takes the wheel 65 about fifteen seconds to complete a revolution. In the illustrated phonograph the ratchet wheel 135 is provided with sixteen teeth. The phonograph may therefore be adjusted for intervals varying from fifteen seconds to four minutes.

When the manipulating knob 108 belonging to the repeating means is adjusted in its intermediate position for a single repetition of every record, the action of the delay means is such, that it lengthens the interval between the changing of every record, there being no delay between the first and second reproduction of one and the same record.

In conjunction with the repeating means (Fig. 10) it was described how the rod 121 is urged into such a position that the pin 122 may release the slide 114 on the rod 110, the rod 121 not being urged into the said position until during the repeating revolution (the revolution subsequent to the record changing revolution) of the wheel 65. But such releasing movement does not take place until the projection 124 has passed, and been actuated by, the pin 115 causing the tone arm to be lowered onto the record for playing the record a second time.

When the manipulating knob 108 of the repeating mechanism has been set for continuous repetition of one and the same record the delay mechanism is inoperative.

The means effecting the starting of the wheel 65 on completion of the playing of a record is shown in Fig. 8 and is also visible in Fig. 2. On the lower end of the sleeve 16, which forms the vertical axle of the tone arm 13, there is a wheel 177 that is in frictional contact with another wheel 178 what is mounted on an axle 179 fixed to the base plate 2. On this wheel 178 is provided a downwardly bent arm 180 (Fig. 2) extending over the wheel 65. On the wheel 65 there is a stud 181 against which the arm 180 presses, when the wheel 65 is at rest, i. e. when the recess 66 is situated opposite the friction roller 67. On the axle 10 of the motor 11 and above the cord disc 9 there is a friction roller 182 which frictionally engages a wheel 184 that is mounted on a fixed pin 183 in the base plate 2, said wheel 184 being about 4.5 times larger than the friction roller 182. Adjacent the axle 183 the wheel 184 is provided with a downwardly projecting pin 185, which, when the wheel rotates, engages two pins 186 and 187 mounted on the wheel 65. When the axle of the motor rotates clockwise the wheel 184 rotates counterclockwise, whereby through the engagement of the pin 185 with the pins 186 and 187 the wheel 184 tries to rotate the wheel 65 counterclockwise until the friction roller 67 is moved beyond the edge of the recess 66.

When the reproducing needle of the tone arm 13 engages the sound groove of a phonograph record, the tone arm swings slowly in clockwise direction. The wheel 177 thereby actuates the wheel 178 counterclockwise, the arm 180 tending to rotate the wheel 65 clockwise on account of its contact with the stud 181. When the wheel 184 rotates, the pin 185 first comes into engagement with the pin 186 and rotates the wheel 65 so that the pin 187 comes into position for engaging the pin 185. However, during the following revolution of the wheel 184 the arm 180 is able to return the wheel 65 so much that the pin 185 the next time again comes into engagement with the pin 186. Every time such engagement takes place the wheel 178 is rotated a little with respect to the wheel 177, on account of the fact that these two wheels are mounted in relatively frictional engagement with one another.

On cessation of the movement of the tone arm e. g. when the needle of the tone arm has reached the end of the groove in the record and slid into a concentric terminal groove no reverse feeding of the wheel 65 takes place by means of the rotation of the arm 180 for which reason the pin 185 of the wheel 184 finally comes into engagement with the pin 187 and rotates the wheel 65 in feeding direction, and to such an extent, that the friction roller 67 engages edge of the recess 61 and rotates the wheel 65 another revolution.

When the tone arm slides into an eccentric terminal groove it is given a backward (counterclockwise) movement which enables the arm 180 to impart to the wheel 65 such counterclockwise motion that contact is produced between the friction roller 67 and the periphery of the wheel.

When the operator starts the phonograph manually by switching on the current to the motor 11 (by means that will be described hereinafter) the tone arm is motionless. The wheel 65 is then started in the first above described way.

When the delay means are used, as previously described, and at the end of every such revolution of the wheel 65 as does not cause a lowering of the tone arm, the latter will only perform a short inward swinging movement under the influence of the rod 85 (Fig. 9) and will then remain motionless, and the wheel 184 will immediately effect a new start of the wheel 65.

The device with which the phonograph is started and stopped is shown in Figs. 1, 3 and 8. In the supply leads to the motor 11 a switch 188 is arranged in a manner not shown so that the current to the motor may be switched off or on by actuating an arm 189. The arm 189 is actuated by a spring 190 that tends to urge the arm from the position shown in Fig. 1 in which the current to the motor is switched on, to the position shown in Fig. 8 and in which current to the motor is switched off. The arm 189 is provided with a slot 191 in which engages a pin 192. The pin 192 is fixed onto a rod 193 that is to a certain extent rotatably and longitudinally displaceable about a pin 194 projecting from the bottom plate 1. The pin 194 slides in a slot 195 provided in the rod 193. On the rod 193 there is a pin 196 that slides in an open slot 197 of another rod 198. Also the rod 198 is provided with a slot adapted to receive the pin 194 projecting from the base plate 1. This slot in the positions shown in the drawing coincides with the slot 195 of the rod 193. Thus the rod 198 is also slidable and rotatable about the pin 194. The rod 198 is fastened to a pin 199 which is slidable in an angular slot 200 provided in the cover plate 2. The pin 199 is provided at its upper end projecting above the cover plate 2 with a manually operable knob 201.

Two stop elements 202 and 203 are rotatably mounted on a pivot 204 fixed to the base plate 1. These stops may engage a projection 205 extending downwards from the arm 193 and lock the arm in the position shown in Fig. 1 (closed circuit). The stop 202 is connected to the frame of the driving motor 11 by means of a rod 206. The stop 203 is provided with an arm 207 situated in the path of motion of the previously mentioned pin 59, that is fixed to the member 55, 57, 58. A spring 208 tends to rotate the arm 207 with the stop 203 in clockwise direction about the pin 204.

In the position of the details as shown in Fig. 8 the current is switched off. When the phonograph is to be started the manipulating knob 201 is moved in an upward direction in the slot 200. The rod 198 is thereby displaced and also the rod 193 is displaced upwardly by the pin 196 in the slot 197. When the position shown in Fig. 1 is arrived at the current has been switched on and the motor started. The stop 203 which is actuated by the spring 208 then snaps into position behind the projection 205 of the arm 193 and locks the arm in the position it has reached. The motor thus continues to work also when the manipulating knob 201 is freed. It is assumed that the tone arm before starting was resting in a lowered position on a support (not shown) at the side of the turntable. Thus when the tone arm is at rest, the wheel 184 will effect the starting of the wheel 65 in a way hereinbefore described. When the wheel 65 starts and the friction roller 67 rolls up on the edge of the wheel the whole motor 11 is rocked a little in counterclockwise direction about the hinge 12. The rod 206 is then displaced to the right, whereby the stop 202 is rotated clockwise so that also this stop is moved into locking position behind the projection 205 of the rod 193. This is made possible by the fact that the stop 202 is somewhat shorter than the stop 203, as may be seen from the drawings.

When the wheel 65 stops again on completion of a record changing operation, the motor 11 will return to the position shown in the drawings, the stop 202 being thereby swung back from its locking position.

If it is wished to stop the phonograph, the manipulating knob 201 is first moved downwards in the slot 200 and then to the left. During the downward movement of the manipulating knob the rod 198 is displaced downwards, whilst the rod 193 remains in its locking position. When the manipulating knob is moved to the left, both the rod 198 and the rod 193 are rotated about a pin 194, the projection 205 thereby being moved beyond the right hand edge of the stop 203. When the stop 202 is not in locking position, which is the case, when the wheel 65 is motionless (whilst a record is being played) the arm 189 under the influence of the spring 190 will be switched over to the position in which the current is switched off, the rod 193 thereby being moved downwards. The motor thus stops immediately. A spring 209 fastened to the cover plate 2 urges the manipulating knob back to the right as soon as the operator releases the knob. All members of the stopping device hitherto mentioned have now reassumed the position shown in Fig. 8.

If the operator tries to stop the phonograph whilst the wheel 65 is rotating, that is during the actual record changing movement, the projection 205 will slide beyond the right hand edge of the stop 203, as in the previous case. The stop 202, however, is now in locking position and the latter is such that the stop 202 projects somewhat to the right of the member 203. The rotation of the rod 193 is sufficient to urge the projection 205 beyond the right hand edge of the member 203, but not sufficient to urge it beyond the right hand edge of the member 202. The projection 205 therefore snaps down from the member 203 and remains in contact with the member 202 which now effects the locking function. Therefore, when the manipulating knob 201 is released the rods 193 and 198 are rotated by the spring 209 to original tension. The projection 205 thereby urges the stop 203 to the left and stretches the spring 208. When the record changing movement is completed, i. e., when the wheel 65 has stopped, the stop 202 will slide from its locking position in a manner hereinbefore described, whereby the arm 193 will snap downwards and the motor will stop. Also in this case the members have reassumed the position shown in Fig. 8.

When all the records of the stack have been played the phonograph is automatically stopped in the way that will be described hereinafter.

Through the supporting plate 20 of the right hand record support (see Fig. 3) extends a rod 210 the upper end of which projects somewhat above the support plate when the latter is not supporting any records (see also Fig. 2). The lower end of the rod 210 passes through the horizontal part 27 of the standard 18. The rod 210 also passes through a slot 211 in the cover plate 2 (see also Fig. 4 and 5). The lower end of the rod 210 extending under the cover plate 2 rests on the bent portion 212 of an arm 213 (Fig. 1 and Fig. 3). The arm 213 is rotatably mounted on a bracket 214 that is fastened to the cover plate 2. The other end of the arm 213 is downwardly bent in the manner shown in Fig. 3 and its end is given the shape of a fork 215. The fork 215 engages an arm 216 that is in connection with a plate 217 that may be swung on a hinge 218 fastened to the base plate 1. The plate 217 is bent at its upper end in such a way as to form a sliding surface with a horizontal portion 219 and an inclined portion 220.

When there are no records on the supporting members 20 and 21, the pin 210 is held raised by the arm portion 212, because the left hand portion of the arm 213 reckoned from its bearing point, is considerably heavier than its right hand portion (Fig. 3). The plate 217 is likewise held tilted to the right by means of the fork 215 provided at the end of the arm 213. When one or more records are placed onto the support plates 20 and 21, the weight of the records will displace the pin 210. The fork 215 will thereby be raised somewhat and tilt the plate 217 (Fig. 3) over to the left. The sliding surface 220, 219 is thereby moved into the path of motion of the lower extremity of the pin 59, when a change of records is effected.

The arm 207 constituting an extension of the stop 203 has at 221 a shoulder or thickened portion that lies in the path of motion of the pin 59. When there are no records on the support members 20 and 21 and the sliding surface 220, 219 of the plate 217 is thus outside the path of motion of the pin 59, the pin 59 will come into contact with the thickened portion 221 of the arm 203 during a record changing movement the arm being rotated anticlockwise about its pivot 204. The stop 203 is hereby removed from its locking position so that the rod 193 together with its projection 205 may snap down onto the stop 202, which, during the course of the record changing movement, is always in locking position.

The working of the apparatus after the last record but one has been played will now be described. At the beginning of the record changing movement for the last record in the stack the pin 210 is actuated by this record and the plate 217 is thus tilted to the left (Fig. 3). The pin 59 will therefore slide up on the oblique sliding surface 220 and continue onto the horizontal part 219. It will then pass over the thickened portion 221 of the arm 207 so that the latter is not actuated. When the movement has continued so long that the record has left the upper end of the pin 210, the plate 217 is nevertheless not able to tilt over to the right immediately because the pin 59 is then on the sliding surface 219 which has at its left hand side a projecting edge portion 222 that is braked by the pin 59. The record changing movement is therefore completed as usual and the plate 217 is not disengaged so that it may tilt over to the right until the record changing member 55, 57, 58 together with the pin 59 has returned to its starting position. When the last record has been played and the next record changing movement commenced the plate 217 is in such a position that the pin 59 does not slide up onto the sliding surface 220 but slides on the left hand side of the edge portion 222. The pin will thus engage the thickened portion 221 of the arm 207, whereby the stop 203 is removed from locking position. On completion of the record changing movement and when the wheel 65 has again stopped with its recess 66 opposite the friction roller 67 the stop 202 will also be removed from locking position and the rod 193 will snap downwards (Fig. 8) the current thereby being switched off.

When the phonograph stops, the tone arm shall preferably not perform an inwardly swinging movement, but remain in its swung-out position and be lowered onto a support provided at the side of the turntable. For this purpose the arm 207 is bent upwardly at its free end 223. When the thickened portion 221 is actuated by the pin 59 or when the projection 205 actuates the stop 203 and swings the latter to the left (as by manual stopping when the record changing mechanism is running) the upwardly bent portion 223 will come into the path of motion of a pin 224 on the arm 83 (see also Fig. 9). Owing to the fact that the pin 224 is braked by the upwardly bent portion 223 when the arm 83 actuated by the pin 28 on the downwardly bent end 86 (Fig. 9) of the arm 85 tends to swing in counterclockwise direction for swinging the tone arm 13 inwards, this swinging movement of the arm 83 is prevented. Instead thereof the arm 85 is turned with respect to the arm 83 at a yielding joint 225. The tone arm 13 thus remains outwardly swung and in this position is lowered onto a support beyond the edge of the turntable before the phonograph stops, the support in question not being shown in the drawing.

The above described process is that which takes place when the record supports are adjusted for small records. When the supports are adjusted for larger records another pin 226 will engage the downward projecting portion while in other respects the apparatus will operate in exactly the same way as that just described.

When the phonograph is to be started, it is important that a record changing movement shall immediately begin, so that a record may be brought down onto the turntable before the reproducing needle of the tone arm is lowered and engages the deposited record. Otherwise the needle might damage the cloth of the turntable and produce disagreeable noises. Therefore the phonograph must not be started when the repeating mechanism is set for repetition, because in such case a record changing movement will not always be effected.

In order to prevent the starting of the phonograph when the repeating mechanism is set in its repeating position the following means are provided (Fig. 8).

To the manipulating pin 107 of the repeating mechanism is connected one end of a rod 227. The other end of the rod 227 is linked to the one leg of a U-shaped rod 228. The rod 228 is slidably mounted on the bottom plate 1 by means of two pins 229 and 230 being movably fitted in slots 231, 232 in the bottom plate. On the pin 229 is mounted a sector-shaped plate 233 that is provided with an upwardly bent edge portion 234 engaging the rod 228. The plate 233 is held in this position by a spring 235.

When the manipulating knob 108 of the repeating mechanism is in the position shown in the drawings the plate 233 will not prevent the manipulation of the switch. When the manipulating knob 108 is moved to the middle or to the opposite end of the slot 109, however, the corner of the plate 233 will slide in over the slot 200 and thus prevent the upward movement of the pin 199.

The phonograph can therefore only be started, when the repeating mechanism is set in non-repeating position. The repeating mechanism cannot be switched over for repetition until the phonograph has been started.

The phonograph may, however, be stopped automatically or by hand even though the repeating mechanism be in repeating position. For this purpose the plate 233 is resiliently mounted as described above so that it will give way to the pin 199, when the latter travels downwards in the slot 200.

Although the description of the invention herein refers only to one certain embodiment of the same, it is to be understood that many variations may be effected within the scope of the invention as defined by the annexed claims. For instance instead of taking the form of grooves the tracks 97 and 98 may also be in the form of rails or ridges upon which a correspondingly shaped control member is adapted to ride, this embodi-

What we claim and desire to secure by Letters Patent is:

1. In a phonograph provided with an automatic record changing mechanism, a control disc, means for rotating said disc by one revolution for each record changing operation, two partly coinciding guide tracks on said disc, one of which is shaped so as to bring about a record change in a rotation of the control disc while the other is inoperative in said respect, a member engageable with said guide tracks, a switch means arranged on said control disc and movable to cause the said member to travel along either of said tracks, a tone arm, means for raising and lowering the same, said means comprising a roller rolling upon said control disc which is provided with a groove into which the roller descends when the tone arm is lowered, a cover plate on the control disc, means whereby said cover plate is moved into a position covering said groove by said member when the latter travels along the track which does not bring about record change, a record changing member, an arm adjustable into and out of the path of motion of said record changing member, a slide mounted on said arm, means whereby said slide upon actuation by the record changing member is moved into an operative position for shifting the cover plate from its groove covering position, a pawl for locking the slide in said operative position, and a spring operative upon release of the slide by said pawl to return the slide into an inoperative position.

2. In a phonograph provided with an automatic record changing mechanism, a control disc, means for rotating said disc by one revolution for each record changing operation, two partly coinciding guide tracks on said disc, one of which is shaped so as to bring about a record change in the rotation of the control disc while the other is inoperative in said respect, a control member engageable with said guide tracks, a switch means arranged on said control disc and movable to cause the said member to travel along either of said tracks, a tone arm, means for raising and lowering the same, said means comprising a roller rolling upon said control disc which is provided with a groove into which the roller descends when the tone arm is to be lowered, a cover plate on the control disc for covering said groove when the tone arm is not to be lowered, means whereby said cover plate is moved into its groove covering position by the control member when the latter travels along the track which does not bring about record change, a record changing member, an arm adjustable into and out of the path of motion of said record changing member, a slide mounted on said arm, means whereby said slide upon actuation by the record changing member is moved into an operative position for shifting the cover plate from its groove covering position, a manually adjustable member for controlling the position of the switch means, means connecting said adjustable member to the slide-carrying arm in such a manner that when said adjustable member moves the switch means to cause the control member continuously to travel along the track which brings about record change the slide-carrying arm is in a position out of the path of motion of the record changing member so that no actuation of the same by the record changing member occurs, and when the said manually adjustable member is adjusted into other positions the position of the slide-carrying arm will be in the path of motion of the record changing member so that the slide will be actuated by the record changing member.

3. In a phonograph provided with an automatic record changing mechanism, a control disc, means for rotating said disc by one revolution for each record changing operation, to partly coinciding guide tracks on said disc, one of which is shaped so as to bring about a record change in a rotation of the control disc and the other being shaped so as to be inoperative in said respect, a control member engageable with said guide tracks, a switch means arranged on said control disc and movable to cause the said member to engage either of said tracks, means actuated by said member to determine a record change when said member engages said first mentioned track, and means for manually adjusting the interval between two consecutive reproductions, said means comprising an arm movable into an operative position wherein the switch means is positioned to cause the control member to travel along the track which does not bring about record change and into an inoperative position.

4. A phonograph according to claim 3, wherein the said arm in its operative position engages the periphery of a disc, and wherein means are provided for meanwhile rotating said disc so that upon rotation of the control disc through a selected number of revolutions the arm engages a recess in the periphery of the disc and is thereby moved into the inoperative position.

5. In a magazine phonograph the combination comprising a record changing mechanism including a control member operable to cause a record-changing to take place, a cam disc, means for rotating said cam disc one revolution for every playing of a record, said cam disc having two partly coinciding grooves for cooperation with said control member, a switching element arranged on said disc and movable into different positions for guiding said control member into one or the other of said grooves in said disc during the rotation thereof, one of said grooves being shaped so as to operate said control member when cooperating therewith for causing a record changing to take place during the rotation of said disc, and the other groove being shaped so as to be inoperative in respect to said control member, and means for manually adjusting the interval between two consecutive reproductions, said means comprising a movable arm having an operative position and an inoperative position and adapted in its operative position to control the switch means in such a manner that the control member is always caused to travel along the track which does not bring about a change of records, a rotatable disc provided with a recess in its periphery with which the said movable arm is adapted to cooperate, a ratchet wheel connected to said disc, a feeder actuated by the control disc and cooperating with said ratchet wheel, and means for manually setting the rotatable disc into any of a number of different angular positions, whereby on rotation of the control disc the ratchet wheel and with it the disc cooperating with the movable arm will be fed one step for each revolution of the control disc until the recess in the rotatable disc has been moved opposite the movable arm and the latter engages the said recess thereby being brought into the inoperative position.

6. A phonograph according to claim 5, wherein the rotatable disc cooperating with the movable arm and the ratchet wheel are mounted on a sleeve, surrounding a shaft, which carries a manipulating knob and an indicating wheel adapted to determine the angular setting of the sleeve, a spring being provided between said shaft and said sleeve which spring tends to rotate the sleeve together with the disc and the ratchet wheel into a position determined by a stop.

7. In a phonograph provided with automatic record changing mechanism, a control disc, means for rotating said disc by one revolution for each record changing operation, with two partly coinciding guide tracks on said disc, one of which is shaped so as to bring about a record change at the rotation of the control disc and the other being shaped so as to be inoperative in said respect, a control member for controlling said record changing mechanism and engageable with said guide tracks, a switch means arranged on said control disc and movable to cause the control member to engage either of said tracks, an arm movable into an inoperative position and an operative position in which latter the arm moves said switch means into a position that causes the control member to travel along the track which does not bring about record change, a rotatable disc provided with a recess in its periphery, a ratchet wheel connected to said disc, a feeder actuable by the control disc and cooperating with said ratchet wheel, means including a manipulating knob, a shaft, an indicating wheel and a spring for manually setting the rotatable disc into any of a number of different angular positions, and means for automatically moving the feeder out of engagement with the ratchet wheel and to release said ratchet wheel upon operation of the record changing mechanism.

8. A phonograph according to claim 7, wherein the manipulating knob is depressible and has means preventing its rotation except upon depression, means being provided which on depression of the manipulating knob remove the movable arm and associated arresting members from the rotatable disc and the ratchet wheel.

9. In a magazine phonograph the combination comprising a record changing mechanism including a control member operable to cause a record-changing to take place, a cam disc, means for rotating said cam disc one revolution for every playing of a record, said cam disc having two partly coinciding grooves for cooperation with said control member, a switching element arranged on said disc and movable into different positions for guiding said control member into one or the other of said grooves in said disc during the rotation thereof, one of said grooves being shaped so as to operate said control member when cooperating therewith for causing a record-changing to take place during the rotation of said disc, and the other groove being shaped so as to be inoperative in respect to said control member, whereby no record-changing will take place during the rotation of said disc when said control member cooperates with said inoperative groove, a tone arm, means whereby, when a record has been played, the tone arm is raised from the record, moved beyond the edge of the same, and, on completion of a record change, swung back over the new record and lowered onto the same, and additional means actuated by said control member for rendering the means for lowering the tone arm inoperative when said control member is in the groove where no record changing takes place.

10. In a magazine phonograph the combination comprising a record changing mechanism including a control member operable to cause a record-changing to take place, a cam disc, means for rotating said cam disc one revolution for every playing of a record, said cam disc having two partly coinciding grooves for cooperation with said control member, a switching element arranged on said disc and movable into different positions for guiding said control member into one or the other of said grooves in said disc during the rotation thereof, one of said grooves being shaped so as to operate said control member when cooperating therewith for causing a record-changing to take place during the rotation of said disc, and the other groove being shaped so as to be inoperative in respect to said control member, whereby no record-changing will take place during the rotation of said disc when said control member cooperates with said inoperative groove, a tone arm, means whereby, when a record has been played, the tone arm is raised from the record, moved beyond the edge of the same, and, on completion of a record change, swung back over the new record and lowered onto the same, including an arcuate groove in the surface of said cam disc, a roller positioned to lie in the path of movement of said arcuate groove during rotation of said cam disc and to enter said groove when the latter is beneath said roller, means carried by the roller for lowering and raising the tone arm in response to movement of the roller into and out of said arcuate groove and means on said cam disc shiftable by the control member to a position to cover said arcuate groove to prevent entry of the roller therein when the control member is in the groove where no record changing takes place.

11. In a magazine phonograph the combination comprising a record changing mechanism including a control member operable to cause a record-changing to take place, a cam disc, means for rotating said cam disc one revolution for every playing of a record, said cam disc having two partly coinciding endless cam tracks on one face of the disc for cooperation with said control members, a switching element mounted on said face of the disc and movable into different positions for guiding said control member from one of said cam tracks to the other during rotation of the disc, one of said endless tracks being shaped so as to operate said control member when cooperating therewith for causing a record-changing to take place during the rotation of said disc, the other of said endless tracks being shaped so as to render said control member inoperative for record changing when cooperating therewith, a tone arm, said cam disc having an arcuate groove in the face thereof, a roller positioned to enter and move out of said groove during rotation of said disc, means cooperating with said roller for lowering and raising said tone arm as the roller lies in and out of said groove, a cover plate on said disc movable to and away from a position to cover said groove to prevent entry of the roller therein, and means on said cover plate engageable with the control member during rotation of the disc when the control member cooperates with the track which renders it inoperative for record changing to shift said cover plate to groove covering position.

12. In a magazine phonograph the combination comprising a record changing mechanism including a control member operable to cause a record-changing to take place, a cam disc, means for rotating said cam disc one revolution for every playing of a record, said cam disc having two partly coinciding endless cam tracks on one face of the disc for cooperation with said control member; a switching element mounted on said face of the disc and movable into different positions for guiding said control member from one of said cam tracks to the other during rotation of the disc, one of said endless tracks being shaped so as to operate said control member when cooperating therewith for causing a record-changing to take place during the rotation of said disc, the other of said endless tracks being shaped so as to render said control member inoperative for record changing when cooperating therewith, a tone arm, said cam disc having an arcuate groove in the face thereof, a roller positioned to enter and move out of said groove during rotation of said disc, means cooperating with said roller for lowering and raising said tone arm as the roller lies in and out of said groove, a cover plate on said disc movable to and away from a position to cover said groove to prevent entry of the roller therein, and means on said cover plate engageable with the control member during rotation of the disc when the control member cooperates with the track which renders it inoperative for record changing to shift said cover plate to groove covering position, and means operable at the beginning of each revolution of the disc to prevent said cover plate covering said groove.

13. In a magazine phonograph, the combination comprising a record changing mechanism including a control member operable to cause a record-changing to take place, a cam disc, means for rotating said cam disc one revolution for every playing of a record, said cam disc having two partly coinciding endless cam tracks on one face of the disc for cooperation with said control member, a switching element mounted on said face of the disc and movable into different positions for guiding said control member from one of said cam tracks to the other during rotation of the disc, one of said endless tracks being shaped so as to operate said control member when cooperating therewith for causing a record-changing to take place during the rotation of said disc, the other of said endless tracks being shaped so as to render said control member inoperative for record changing when cooperating therewith, a tone arm, said cam disc having an arcuate groove in the face thereof, a roller positioned to enter and move out of said groove during rotation of said disc, means cooperating with said roller for lowering and raising said tone arm as the roller lies in and out of said groove, a cover plate on said disc movable to and away from a position to cover said groove to prevent entry of the roller therein, and means on said cover plate engageable with the control member during rotation of the disc when the control member cooperates with the track which renders it inoperative for record changing to shift said cover plate to groove covering position, and means for automatically removing said cover plate from its groove covering position when a record is to be played.

14. In a magazine phonograph the combination comprising a record changing mechanism including a control member operable to cause a record-changing to take place, a cam disc, means for rotating said cam disc one revolution for every playing of a record, said cam disc having two partly coinciding endless cam tracks on one face of the disc for cooperation with said control member, a switching element mounted on said face of the disc and movable into different positions for guiding said control member from one of said cam tracks to the other during rotation of the disc, one of said endless tracks being shaped so as to operate said control member when cooperating therewith for causing a record-changing to take place during the rotation of said disc, the other of said endless tracks being shaped so as to render said control member inoperative for record changing when cooperating therewith, a tone arm, said cam disc having an arcuate groove in the face thereof, a roller positioned to enter and move out of said groove during rotation of said disc, means cooperating with said roller for lowering and raising said tone arm as the roller lies in and out of said groove, a cover plate on said disc movable to and away from a position to cover said groove to prevent entry of the roller therein, and means on said cover plate engageable with the control member during rotation of the disc when the control member cooperates with the track which renders it inoperative for record changing to shift said cover plate to groove covering position, and means for automatically removing said cover plate from its groove covering position when a record is to be played, said last recited means including an arm, a slide on said arm, a pin carried by the slide means mounting said arm for adjustment to bring said pin into and out of a position in the path of motion of the record changing control member so that when said pin is in said path the pin and slide will be shifted on said arm into a position to engage said cover member as it moves by said pin during rotation of said disc.

15. In a phonograph provided with an automatic record changing mechanism, a control disc, means for rotating said disc by one revolution for each record changing operation, two partly coinciding guide tracks on said disc, one of which is shaped so as to bring about a record change in a rotation of the control disc while the other is inoperative in said respect, a member engageable with said guide tracks, a switch means arranged on said control disc and movable to cause the said member to travel along either of said tracks, a tone arm, means for raising and lowering the same, said means comprising a roller rolling upon said control disc which is provided with a groove into which the roller descends when the tone arm is lowered, a cover plate on the control disc means whereby said cover plate is moved into a position covering said groove by said member when the latter travels along the track which does not bring about record change, a record changing member, an arm adjustable into and out of the path of motion of said record changing member, a slide mounted on said arm, means whereby said slide upon actuation by the record changing member is moved into an operative position for shifting the cover plate from its groove covering position, a pawl for locking the slide in said operative position and a spring operative upon release of the slide by said pawl to return the slide into an inoperative position, a rod mounted for longitudinal reciprocating movement on the control disc, one end of said rod being projectable into the path of movement of the control member along one track and the other end of said rod being projectable into the path of movement of the control member along the other track, each end of said rod being engageable by said control member to shift said rod, and means carried by said rod and positioned to engage and release said pawl when the rod is shifted by engaging the control member while traveling along the track which does not effect record change.

16. In a magazine phonograph having a turntable, stationary means for supporting a pile of records above the turntable, and means engaging the lowermost record of the pile to release said lowermost record from the pile supporting means to drop it onto the turntable, the combination of a control member connected to said releasing means, a cam disc, means for rotating said cam disc one revolution for every playing of a record, said cam disc having two partly coinciding grooves, said control member being engageable with either of said grooves, a switching element arranged on said disc and movable into different positions for guiding said control member into one or the other of said grooves in said disc during the rotation thereof, one of said grooves being shaped so as to give said control member when engaging therewith during the rotation of said disc and thus the releasing means, a movement for depositing a record on the turntable, and the other groove being shaped so as to be inoperative to give the control member and thus the releasing means, any movement when said control member engages the last-mentioned groove during the rotation of said disc.

17. In a magazine phonograph having a turntable, stationary means for supporting a pile of records above the turntable, and means engaging the lowermost record of the pile to release said lowermost record from the pile supporting means to drop it onto the turntable, the combination of a control member connected to said releasing means, a cam disc, means for rotating said cam disc one revolution for every playing of a record, said cam disc having two partly coinciding grooves, said control member being engageable with either of said grooves, a switching element arranged on said disc and movable into different positions for guiding said control member into one or the other of said grooves in said disc during the rotation thereof, one of said grooves being shaped so as to give said control member when engaging therewith during the rotation of said disc and thus the releasing means, a movement for depositing a record on the turntable, and the other groove being shaped so as to be inoperative to give the control member and thus the releasing means any movement when said control member engages the last-mentioned groove during the rotation of said disc, means on said switch element whereby the same is actuated by said control member when the latter engages one of said grooves and when said switching element is switched over into a position for guiding said control member to the other groove on the next rotation of the cam, and a manually adjustable means whereby the last-mentioned means may be actuated for switching over the switching element before the latter comes into engagement with the said control member.

ERIK WENNERBO.
HELGE NORÉN.

REFERENCES CITED

The following references are of record in the file of this patent:

UNITED STATES PATENTS

| Number | Name | Date |
| --- | --- | --- |
| 2,299,633 | Knox et al. | Oct. 20, 1942 |
| 2,307,030 | Erwood | Jan. 5, 1943 |
| 2,313,262 | Pressley | Mar. 9, 1943 |
| 2,330,383 | Roe | Sept. 28, 1943 |
| 2,351,972 | Johnson | June 20, 1944 |